United States Patent
Aalst

[11] Patent Number: 5,470,191
[45] Date of Patent: Nov. 28, 1995

[54] MULTI PURPOSE UNLOADING ARM

[75] Inventor: Gerrit V. Aalst, Leiderdorp, Netherlands

[73] Assignee: Fuller Offshore Finance Corporation B.V., Koudekerk aan de Rijn, Netherlands

[21] Appl. No.: 91,506

[22] Filed: Jul. 14, 1993

[51] Int. Cl.[6] .................................................. B65G 67/60
[52] U.S. Cl. ........................... 414/726; 141/67; 406/196
[58] Field of Search ............................... 141/67; 406/39, 406/196; 414/140.7, 141.2, 726, 909

[56] References Cited

U.S. PATENT DOCUMENTS

| 3,892,079 | 7/1975 | Hirano et al. | 414/909 X |
| 4,497,608 | 2/1985 | Sheppard et al. | 414/726 |
| 5,341,856 | 8/1994 | Appenzeller | 406/39 X |

FOREIGN PATENT DOCUMENTS

| 3724668 | 1/1989 | Germany | 406/196 |
| 414346 | 11/1946 | Italy | 414/141.2 |
| 1-271324 | 10/1989 | Japan | 406/39 |

Primary Examiner—David A. Bucci
Assistant Examiner—Janice L. Krizek
Attorney, Agent, or Firm—Daniel DeJoseph

[57] ABSTRACT

What is disclosed is an articulated arm assembly which can be utilized in either a pneumatic or a mechanical fashion. The arm assembly comprises a base structure and an arm structure, with the arm structure being comprised of a frame and pneumatic tubing supported by said frame. Each of the frame and pneumatic tubings have an end located at the stinger section of the arm structure and another end located near the base structure. The end of the pneumatic tubing located at the stinger section can be operatively connected to a nozzle in a manner enabling, when the arm is operating in a pneumatic mode, material to be conveyed from said nozzle toward the end of said pneumatic tubing located near the base structure, and the end of the frame located at the stinger section can be operatively connected to a mechanical lifting device when the arm is operating in a mechanical mode.

8 Claims, 2 Drawing Sheets

MULTI PURPOSE UNLOADING ARM

This invention relates to a material unloader that is particularly useful for unloading material from vessels such as a bulk carrier or general cargo ship or a railroad car.

When a ship has its holds loose-loaded with bulk material, there are certain problems associated with subsequently unloading the holds. Traditional mechanized methods have involved using a crane supported grab. Current technology for mechanically unloading bulk cargo includes mechanical grabs of various designs, mechanical screws, conveyor belts and bucket elevators, to name a few.

Such devices are mounted on gantries, cranes, pedestals and arms or suspended from above on wires from a fixed support, travel hoists or derricks. Each device is suited to certain materials, but cannot be used efficiently for all bulk materials.

Other methods of unloading materials include pneumatic systems involving blowing the material from fluidized state holds, or pneumatic systems involving vacuum pipe suction, or fixed installation elevator systems.

All of these methods have their uses and are widely adopted but also have disadvantages. One of the major disadvantages is that different materials typically are preferably unloaded by different methods. For example, cement clinker and materials having a similar physical makeup are typically removed through a mechanical method whereas a final cement product and other powder like materials may be advantageously unloaded by pneumatic means. In addition, different unloading methods may be necessitated by the relative position of the material within the hold or container. Furthermore, different unloading methods may be required depending upon how far one is through the unloading process. For example, dust may be generated during mechanical unloading of certain materials, and therefore if it is desired to completely clean out the hold it will be necessary to utilize a suction unloading system as the last step in an unloading process.

In the above loading or unloading procedures, provisions may have to be made for using more than one type of equipment. Thus a grab crane may have to be placed on a dock alongside a suction arm. Both devices take up valuable space, are expensive, and may be, depending on the range and type of materials to be unloaded, used only intermittently during the unloading process.

The present invention overcomes the problems inherent in the prior art in that it is directed to a single piece of equipment which is adaptable to unloading many different types of materials. The invention comprises a material unloading device in the form of an articulated arm assembly which is adaptable to be deployed in both pneumatic and mechanical modes of operation.

The invention will now be described by way of examples with reference to the accompanying drawings in which.

Like numerals in both drawings refer to similar elements.

Figure 1:
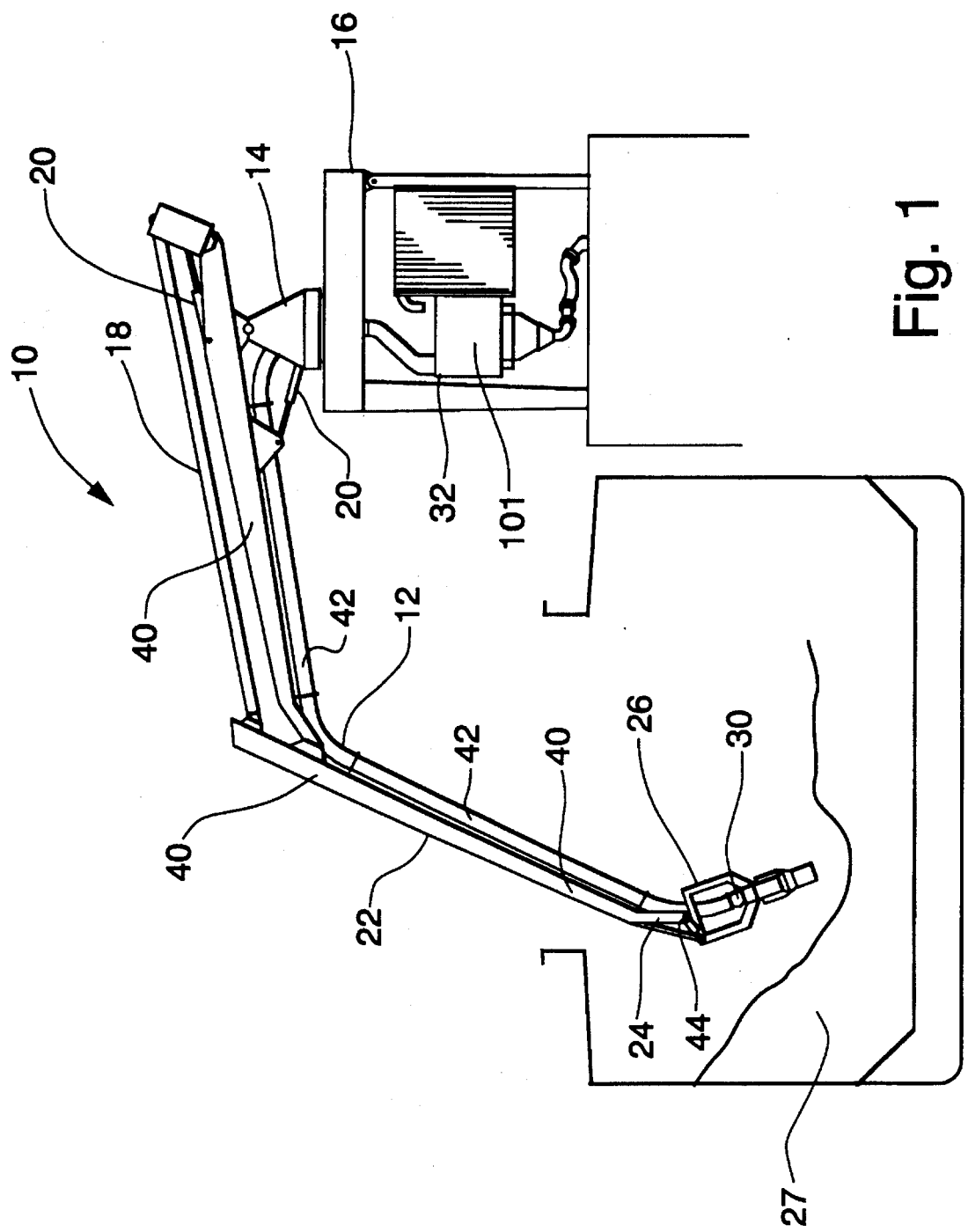
FIG. 1 is a side elevational view of the material unloading device of the present invention as displayed in a suction unloading mode, and illustrating the same as being mounted, in the depicted embodiment, on a pedestal that may be positioned on a dock.

In FIG. 1, the unloading device 10 of the present invention comprises a base structure, which, as depicted, is a rotatable stand or base structure 14, and which at times may serve to counterbalance arm assembly 12. Stand 14, in the depicted embodiment, is mounted on pedestal or supporting structure 16, which, in the case of ship unloading, may be permanently fixed to a dock. It is understood that stand 14 does not have to be mounted to such a supporting structure in every embodiment. For example, the stand may at times be mounted directly to the dock. In another embodiment, the stand itself can be permanently fixed to a dock or a mobile vehicle. Arm assembly 12 in the depicted embodiment is a three section arm which is mounted on rotatable stand 14. Arm assembly 12 is comprised of a boom section 18, jib section 22 and stinger section 24. In other embodiments a four section arm, in which a second jib is utilized, is also contemplated according to the invention. In such cases, the second jib will be located intermediate jib 22 and stinger 24. Boom 18 extends from rotatable stand 14. Boom 18 is typically raised, or lowered utilizing hydraulic cylinders 20. In a preferred embodiment of the invention, dual or variable speed hydraulic controls, which utilize proportional valves, may be utilized to enable the practitioner of the invention to deploy variable speed arm movement. Articulated jib 22 extends from boom 18, and is pivotally mounted on boom 18. Stinger 24 extends from, and is pivotally mounted relative to, jib 22. The desired movement of jib 22 and stinger 24 may also be controlled by hydraulic controls (not shown).

Articulated arm 12, and therefore each of the boom, jib and stinger sections thereof are comprised of, in combination, (1) a supporting frame structure 40, which is typically made of metal and should be sturdy enough to support vacuum pneumatic tubing means 42 and to enable arm 12 to have a high lifting capacity, and (2) vacuum pneumatic tubing means 42 which is supported by frame structure 40. When the arm of the present invention is in a pneumatic mode, a vacuum nozzle 26 is connected to the vacuum tubing 42 of stinger section 24 such that nozzle 26 is adaptable to being immersed into the bulk material 27 that is being unloaded. As indicated, nozzle 26 is connected to vacuum tubing 42 which serves, when the articulated arm of the present invention is operating in a pneumatic mode, as a conveying line for the bulk material. The tubing will generally have rigid sections 43 and flexible sections 45 which accommodate the articulated movement of the arm. In the embodiment depicted, nozzle 26 is also partially supported, for purposes of stability, by frame 40 at point 41.

As indicated, the vacuum tubing used in the preferred embodiment of the invention will preferably be comprised of alternate sections of rigid conduit and flexible hose, with the tubing having a first end 30, located at the stinger section of the arm, and a second end 32, which is located proximate to base structure 14 and transfer vessel 101. Nozzle 26 is attachable to the first end 30 of the pneumatic tubing conveying line. The second end 32 is connected during the pneumatic operation of the device of the present invention to a transfer vessel 101 that, in the depicted embodiment, is located inside pedestal 16.

Figure 2:
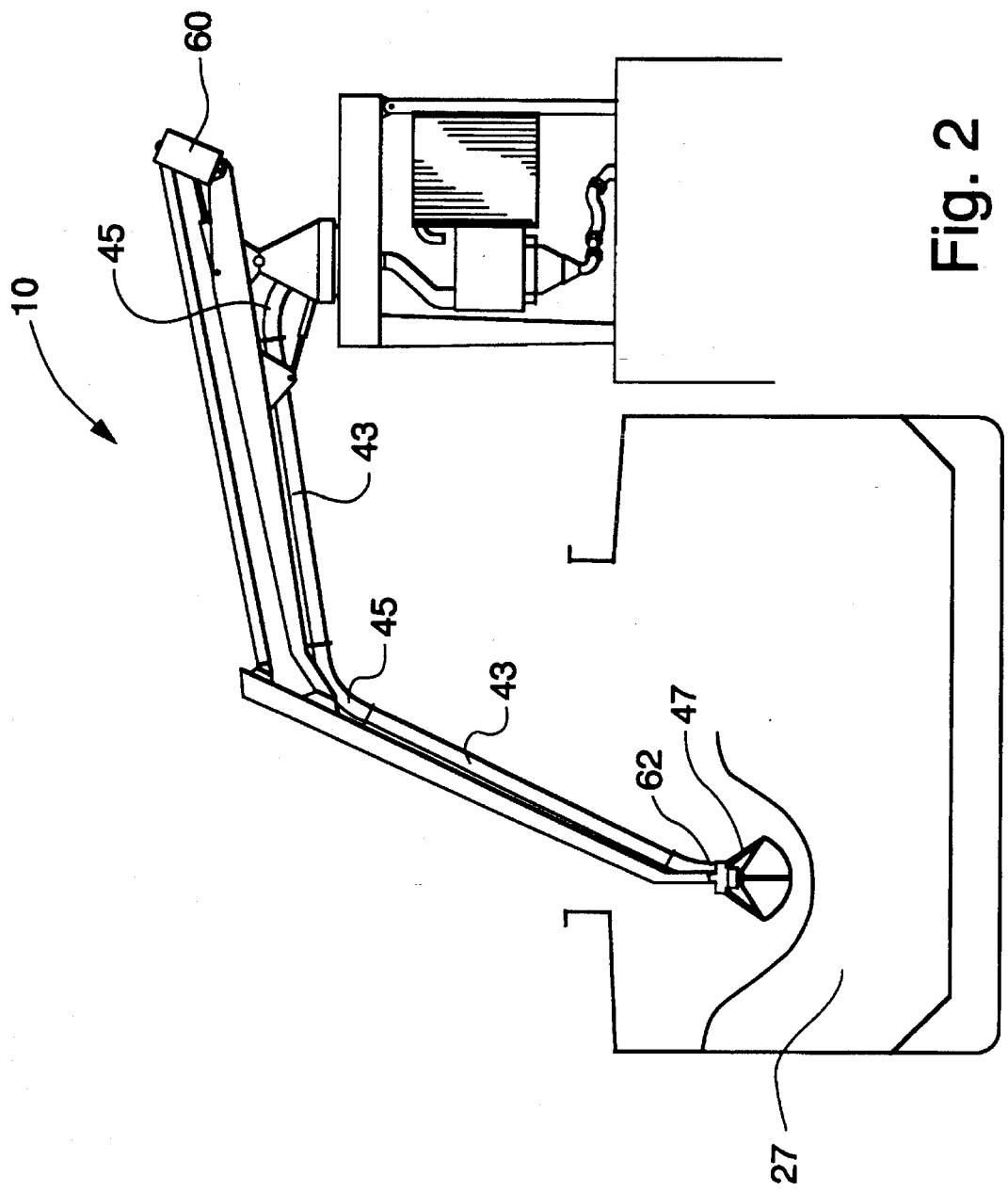
FIG. 2 is also a side elevational view of the material unloading device of the present invention, which is in a mechanical unloading mode.

As indicated, the articulated arm of the present invention is comprised, in combination, of a frame structure section 40 which supports pneumatic tubing. Frame structure 40 has a second end 60, located in the vicinity of base structure 14, and a first end 62, which first end 62 is located at the stinger section of the articulated arm 12. The articulated arm of the present invention is unique in that, in addition to having the capacity for the pneumatic transfer of material, the frame structure itself is adaptable to being fitted at its first end with a mechanical material handling device. It is anticipated that such a material handling device will primarily be a mechanical grabber. However, the material handling end of the frame can alternatively be fitted with hooks, pallet lifting devices, container lifting devices or other attachments. In the depicted embodiment of FIG. 2, first end 62 of the frame is fitted with a grabber device 47.

Typically, the attachment of the mechanical lifter will be accomplished by removing the suction pipe nozzle from either the vacuum tubing alone, or, when attached to both, from the tubing and the frame, as the case may be, and then attaching the mechanical lifting device to the first end of the frame.

Control of the articulating arm of the present invention, and the mechanical lifting device, can be achieved through a number of means known to those skilled in the art. For example, remote radio control means or, in a simple form, a series of ropes or cables may be employed.

As indicated, the articulated arm of the present invention may be stationary, such as by being permanently fixed to a dock. Alternatively, the arm can be mobile, such as by being road mobile or mobile along a dock and may therefore be adapted to being utilized at a number of work stations.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed is:

1. An articulated arm assembly for conveying a variety of material, either in a pneumatic or in a mechanical fashion, said arm assembly comprising:

a base structure and an arm structure, with the arm structure being comprised of, in combination, a frame and vacuum pneumatic tubing supported by said frame, said frame of said arm structure including a boom section pivotally connected to said base structure; a first jib section pivotally connected to said boom section; and a stinger section pivotally connected to said first jib section, wherein each of said frame and said pneumatic tubing has a first end located at the stinger section of the arm structure and a second end located near the base structure, wherein the stinger section is adaptable to interchangeably attach either (1) a suction nozzle which suction nozzle is attached to the first end of the pneumatic tubing in a manner enabling, when the arm is operating in a pneumatic mode, material to be conveyed through said nozzle toward the second end of said pneumatic tubing, or (2) a mechanical lifting device which is actuated to grasp and contain material to thereby enable material to be conveyed entirely mechanically by said arm assembly.

2. The arm assembly of claim 1 wherein the mechanical lifting device is a mechanical grabber.

3. The arm assembly of claim 1 wherein the movement of the frame and the mechanical lifting device are controlled by remote control radio means.

4. The arm assembly of claim 1 wherein the arm assembly is attached to a stationary structure.

5. The arm assembly of claim 1 wherein the arm assembly is fixed to a dock.

6. The arm assembly of claim 1 wherein the arm assembly is attached to a mobile unit.

7. The arm assembly of claim 1 wherein the arm structure is capable of variable speed movement.

8. The arm assembly of claim 1 wherein the arm structure further comprises a second jib section which is located intermediate, and is pivotally connected to, the first jib section and the stinger section.

* * * * *